United States Patent
Ibrahim et al.

(10) Patent No.: US 12,420,267 B1
(45) Date of Patent: Sep. 23, 2025

(54) g-$C_3N_4$@CoO/MgAl$_2$O$_4$ NANOCOMPOSITE FOR HYDROGEN GENERATION

(71) Applicant: IMAM MOHAMMAD IBN SAUD ISLAMIC UNIVERSITY, Riyadh (SA)

(72) Inventors: Mohamed Nady Abd El-Hameed Ibrahim, Riyadh (SA); Mohamed Khairy Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/195,007

(22) Filed: Apr. 30, 2025

(51) Int. Cl.
| | | |
|---|---|---|
| *B01J 27/24* | (2006.01) | |
| *B01J 23/00* | (2006.01) | |
| *B01J 23/02* | (2006.01) | |
| *B01J 35/30* | (2024.01) | |
| *B01J 35/45* | (2024.01) | |
| *B01J 37/04* | (2006.01) | |
| *B01J 37/08* | (2006.01) | |
| *C01B 3/06* | (2006.01) | |

(52) U.S. Cl.
CPC .............. *B01J 27/24* (2013.01); *B01J 23/005* (2013.01); *B01J 23/02* (2013.01); *B01J 35/393* (2024.01); *B01J 35/45* (2024.01); *B01J 37/04* (2013.01); *B01J 37/088* (2013.01); *C01B 3/065* (2013.01)

(58) Field of Classification Search
CPC ........ B01J 35/45; B01J 35/393; B01J 23/005; B01J 23/02; B01J 37/04; B01J 37/088; C01B 3/065
See application file for complete search history.

(56) References Cited

U.S. PATENT DOCUMENTS

| | | |
|---|---|---|
| 2015/0307352 A1 | 10/2015 | Kumar et al. |
| 2017/0354962 A1 | 12/2017 | D'Souza et al. |
| 2023/0147397 A1 | 5/2023 | Katabathini et al. |

FOREIGN PATENT DOCUMENTS

| | | |
|---|---|---|
| RU | 2 323 045 C1 | 4/2008 |

OTHER PUBLICATIONS

Cruz et al., ACS Appl. Mater. Interface, (2025), v.17, p. 13029-13036 (Pub Mar. 7, 2024).*
M. Salih Keskin, et al., "Development of Al2O3-supported nanobimetallic Co—La—B catalyst for boosting hydrogen release via sodium borohydride hydrolysis", Journal of the Australian Ceramic Society, May 14, 2024, 11 pages.
Danil M. Shivtsov, et al., "Hydrogen Production by N-Heterocycle Dehydrogenation over Pd Supported on Aerogel-Prepared Mg—Al Oxides", Catalysts, vol. 13, 334, Feb. 2, 2023, 19 pages.

* cited by examiner

*Primary Examiner* — Yong L Chu
(74) *Attorney, Agent, or Firm* — Oblon, McClelland, Maier &Neustadt, L.L.P.

(57) ABSTRACT

A method for hydrogen ($H_2$) generation includes contacting a graphite-phase carbon nitride cobalt oxide and magnesium aluminum oxide nanocomposite (g-$C_3N_4$@CoO/MgAl$_2$O$_4$) with sodium borohydride (NaBH$_4$) in water (H$_2$O) and hydrolyzing the sodium borohydride to generate hydrogen. The g-$C_3N_4$@CoO/MgAl$_2$O$_4$ nanocomposite comprises a graphite-phase carbon nitride (g-$C_3N_4$) in an amount of 5 to 15 percent by weight (wt. %), cobalt oxide in an amount of 1 to 10 wt. %, and magnesium aluminum oxide (MgAl$_2$O$_4$) in an amount of 75 to 95 wt. % based on a total weight of the g-$C_3N_4$@CoO/MgAl$_2$O$_4$ nanocomposite.

20 Claims, 5 Drawing Sheets

# g-$C_3N_4$@CoO/MgAl$_2$O$_4$ NANOCOMPOSITE FOR HYDROGEN GENERATION

BACKGROUND

Technical Field

The present disclosure is directed towards hydrogen ($H_2$) generation techniques, and more particularly, relates to a production of hydrogen using a graphite-phase carbon nitride cobalt oxide and magnesium aluminum oxide (g-$C_3N_4$@CoO/MgAl$_2$O$_4$) nanocomposite.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

In recent years, rapid industrialization and increases in global population have led to an escalating demand for energy. The growing energy demand has necessitated exploration and development of alternative energy sources capable of supplementing and/or replacing conventional non-renewable energy resources. Depletion of fossil fuel reserves, coupled with increasing environmental concerns regarding greenhouse gas emissions and climate change, has compelled societies to transition towards clean and renewable energy solutions. Solar energy represents one such renewable energy source that is both widely available and cost-effective in terms of energy generation; however, a limitation of solar energy is an associated energy storage challenge. Energy harvested from solar power requires efficient storage solutions to supply energy during non-sunlight hours and/or periods of high demand. Conventional battery storage systems, while commonly employed, present several drawbacks including high capital costs, frequent replacement needs, limited lifespan, performance degradation over time, and environmental disposal concerns associated with toxic and hazardous materials used in battery manufacturing. Cost and complexity of safely recycling or disposing of batteries further exacerbate challenges associated with solar power and battery systems, posing barriers to the widespread adoption of battery-based energy storage solutions.

Hydrogen ($H_2$) energy storage and fuel cell technologies have emerged as viable alternatives to conventional battery storage systems, offering a plurality of advantages. Hydrogen is an inherently clean energy carrier that, when utilized in fuel cells, emits only water vapor as a byproduct. Hydrogen possesses a high energy density relative to conventional battery technologies, permitting the storage of large amounts of energy in a compact volume. This characteristic makes hydrogen advantageous for transportation applications where weight and space are factors. Hydrogen-powered fuel cells enable rapid refueling with refueling times comparable to those of gasoline-powered vehicles which is in contrast to extended charging times associated with battery electric vehicles (BEVs). Hydrogen fuel cells offer extended operational ranges, making them well-suited for heavy-duty applications like commercial trucking, maritime transport, and aviation. Hydrogen-based systems are lighter than equivalent battery-based storage solutions, enhancing efficiency and payload capacity. Hydrogen may be produced via electrolysis using renewable energy sources, such as solar and wind power, allowing for sustainable, large-scale energy storage solutions. Unlike batteries, which suffer from degradation over time, hydrogen storage and fuel cell systems may maintain consistent performance over extended periods with proper maintenance, reducing the need for frequent replacement.

Despite listed advantages, current methodologies and materials used for hydrogen production, storage, and utilization present several technical and economic challenges. Production of hydrogen through conventional methods, such as steam methane reforming (SMR), results in carbon emissions unless it is coupled with carbon capture and storage (CCS) technologies. Electrolysis-based hydrogen production, while cleaner, remains cost-intensive due to high energy input requirements and limited efficiency of current electrolyzer technologies. Existing hydrogen storage methods, including high-pressure gaseous storage and cryogenic liquid storage, require advanced materials and engineering solutions to ensure safe, efficient, and cost-effective containment. Infrastructure limitations pose a barrier to the widespread adoption of hydrogen energy. Existing energy distribution networks are designed for fossil fuels and electrical grids, necessitating investment in hydrogen production, distribution, and refueling infrastructures. Fuel cell technology, while promising, requires further advancements in catalyst materials, membrane durability, and system efficiency to achieve cost parity with conventional energy solutions.

There exists a need for improved methods, materials, and systems for hydrogen production, storage, and utilization that address limitations. Advancements in hydrogen storage technologies, including solid-state materials, chemical carriers, and high-efficiency electrolysis methods, may enhance economic viability and scalability of hydrogen as a sustainable energy solution. Improved fuel cell designs with high efficiency, longevity, and reduced reliance on rare and/or expensive materials may accelerate a transition to a hydrogen-based energy economy.

Accordingly, an object of the present disclosure is to provide a method for hydrogen ($H_2$) generation using a graphite-phase carbon nitride cobalt oxide and magnesium aluminum oxide (g-$C_3N_4$@CoO/MgAl$_2$O$_4$) nanocomposite, that may circumvent the drawbacks and limitations, such as low catalytic efficiency, limited stability, high production costs, and environmental concerns, of methods and materials known in the art.

SUMMARY

In an exemplary embodiment, a method for hydrogen ($H_2$) generation is described. The method includes contacting a graphite-phase carbon nitride cobalt oxide and magnesium aluminum oxide (g-$C_3N_4$@CoO/MgAl$_2$O$_4$) nanocomposite with sodium borohydride (NaBH$_4$) in water ($H_2O$) and hydrolyzing the sodium borohydride to generate hydrogen. The g-$C_3N_4$@CoO/MgAl$_2$O$_4$ nanocomposite comprises a graphite-phase carbon nitride (g-$C_3N_4$) in an amount of 5 to 15 percent by weight (wt. %), cobalt oxide in an amount of 1 to 10 wt. %, and magnesium aluminum oxide (MgAl$_2$O$_4$) in an amount of 75 to 95 wt. % based on a total weight of the g-$C_3N_4$@CoO/MgAl$_2$O$_4$ nanocomposite.

In some embodiments, the hydrogen is generated at a hydrogen generation rate of 1800 to 2200 milliliters per minute per gram (mL/min/g) of g-$C_3N_4$@CoO/MgAl$_2$O$_4$ nanocomposite.

In some embodiments, the contacting occurs at a temperature of 30 to 50° C.

In some embodiments, three times to six times more hydrogen is liberated after five minutes when the sodium borohydride is reacted with water in the presence of the g-$C_3N_4$@CoO/$MgAl_2O_4$ nanocomposite in comparison to the reaction of sodium borohydride reacted with water in the absence of the g-$C_3N_4$@CoO/$MgAl_2O_4$ nanocomposite.

In some embodiments, the g-$C_3N_4$@CoO/$MgAl_2O_4$ nanocomposite has a d-value of 0.33 to 0.35 nanometers (nm).

In some embodiments, the g-$C_3N_4$@CoO/$MgAl_2O_4$ nanocomposite includes the graphite-phase carbon nitride (g-$C_3N_4$) in an amount of 8 to 12 wt. %, cobalt oxide in an amount of 3 to 7 wt. %, and magnesium aluminum oxide ($MgAl_2O_4$) in an amount of 80 to 90 wt. %, based on a total weight of the g-$C_3N_4$@CoO/$MgAl_2O_4$ nanocomposite.

In some embodiments, the g-$C_3N_4$ is in the form of nanosheets having an average length of 100 to 500 nm and an average width of 50 to 500 nm.

In some embodiments, the cobalt oxide and the $MgAl_2O_4$ are in the form of nanoparticles having an average size of 6 to 12 nm and the cobalt oxide and the $MgAl_2O_4$ nanoparticles are dispersed on the g-$C_3N_4$ nanosheets.

In some embodiments, the g-$C_3N_4$@CoO/$MgAl_2O_4$ nanocomposite has interplanar spacing of 0.22 to 0.24 nm, 0.18 to 0.20 nm, 0.12 to 0.14 nm, and 0.10 to 0.12 nm determined through selected area electron diffraction analysis (SAED).

In some embodiments, the g-$C_3N_4$@CoO/$MgAl_2O_4$ nanocomposite is porous.

In some embodiments, an electrical potential is not applied during the contacting.

In some embodiments, the g-$C_3N_4$@CoO/$MgAl_2O_4$ nanocomposite has plane spacing of 0.33 to 0.35 nm, 0.24 to 0.26 nm, 0.19 to 0.21 nm, and 0.20 to 0.22 nm determined through high-resolution transmission electron microscopy (HR-TEM).

In some embodiments, the g-$C_3N_4$@CoO/$MgAl_2O_4$ nanocomposite is crystalline.

In some embodiments, the g-$C_3N_4$@CuO/$MgAl_2O_4$ nanocomposite includes a cobalt oxide (CoO) phase, a magnesium oxide (MgO) phase, a magnesium aluminum oxide ($MgAl_2O_4$) phase, and a graphite-phase carbon nitride (g-$C_3N_4$) phase.

In some embodiments, the $MgAl_2O_4$ phase is spinel.

In some embodiments, the MgO phase is cubic.

In some embodiments, the g-$C_3N_4$@CoO/$MgAl_2O_4$ nanocomposite does not include aluminum oxide ($Al_2O_3$).

In some embodiments, a process of making the g-$C_3N_4$@CoO/$MgAl_2O_4$ nanocomposite includes mixing a magnesium (Mg) salt, an aluminum (Al) salt, a cobalt (Co) salt, and a fuel in water to form a mixture. The method further includes heating the mixture to form a solid product, calcinating the solid product at a temperature of 600 to 800° C. for 2 to 4 hours to form a product, mixing the product with urea, and heating to a temperature of 550 to 650° C. for 20 to 60 minutes to form the g-$C_3N_4$@CoO/$MgAl_2O_4$ nanocomposite.

In some embodiments, the fuel is dextrose ($C_6H_{12}O_6$).

In some embodiments, the contacting occurs for 0.5 to 10 minutes.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals will be used to designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and/or other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the term "amount" refers to a level and/or concentration of one or more reactants, catalysts, or materials present in a reaction mixture.

As used herein, the term "particle" refers to an object that acts as a whole unit with regard to its transport and properties.

As used herein, the term "nanocomposite" refers to a material composed of two or more distinct components in which at least one dimension of the component is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material. These components are combined to form a composite material that exhibits properties, such as increased strength, electrical conductivity, chemical reactivity, and/or thermal stability, compared to the individual components.

Nanocomposites may be used in various applications, including catalysis, environmental remediation, electronics, and materials science. The definition within the scope of the invention includes porous media, colloids, gels, copolymers, and solid combination of a bulk matrix and nano dimensional phase(s) differing in properties due to dissimilarities in structure and chemistry. The nanocomposites morphologies that are generally prepared include phase separated systems, intercalated systems, and exfoliated systems. Nanocomposites include ceramic matrix nanocomposites (CMNC), polymer matrix nanocomposites (PMNC), metal matrix nanocomposites (MMNC), any combination thereof, and the like.

As used herein, the term "nanoparticles (NPs)" refers to particles having a particle size of 1 nanometer (nm) to 500 nm within the scope of the present disclosure. The NPs may exist in various morphological shapes, such as nanotubes, nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, mixtures thereof, and the like.

As used herein, the term "fraction" refers to a numerical quantity which defines a part up to but not including 100 percent or the entirety of the thing in question.

As used herein the term "disposed" refers to being positioned, placed, deposited, arranged, or distributed in a particular manner.

As used herein, the term "X-ray diffraction," "XRD" or "X-ray crystallography," refers to a technique for obtaining information on an atomic structure of crystalline materials used as a standard laboratory technique. Unless otherwise specified, XRD shall include an analytical technique based on the diffraction of X-rays by matter, especially for crystalline materials.

As used herein, the term "Scanning electron microscopy" or "SEM" refers to a surface-imaging technique that produces images of a sample by scanning the sample with a focused beam of electrons. Unless otherwise specified, SEM shall include all imaging techniques using electron beams for imaging.

As used herein, the term "interplanar spacings" refers to the distances between adjacent planes of atoms in a crystal lattice, typically measured in nanometers (nm) or angstroms (Å).

As used herein, the term "plane spacings" refers to the distances between parallel planes of atoms within a crystal structure, typically measured in nanometers (nm) or angstroms (Å).

In the disclosure, a numerical value interval (i.e., a numerical value range) is involved and, if not specifically stated, an optional numerical value distribution is considered continuous within the numerical value interval, and includes two numerical value endpoints (i.e., minimum and maximum values) of the numerical value range, and each numerical value between the two numerical value endpoints.

The temperature parameters in the present application, if not specifically limited, are both allowed to be constant temperature processing and allowed to be varied within a certain temperature interval. The constant temperature processing allows temperature to fluctuate within the precision range of instrument control. It is allowed to fluctuate in the range of, for example, ±5° C., ±4° C., ±3° C., ±2° C., ±1° C.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all isotopes of atoms occurring in the present compounds and complexes. Isotopes include those atoms having the same atomic number but different mass numbers.

Aspects of the present disclosure are directed toward a method of generating hydrogen using a graphite-phase carbon nitride cobalt oxide and magnesium aluminum oxide (g-$C_3N_4$@COO/MgAl$_2$O$_4$) nanocomposite (also referred as "g-$C_3N_4$@CoO/MgAl$_2$O$_4$ nanocomposite," "nanocomposite," "g-$C_3N_4$@CoO/MgAl$_2$O$_4$ catalyst," or "catalyst") as a catalyst to enhance the hydrolysis of sodium borohydride (NaBH$_4$) for production of hydrogen gas. The catalyst facilitates safe and rapid release of hydrogen from NaBH$_4$, making it an efficient solution for clean hydrogen production. The present disclosure circumvents drawbacks of prior art by addressing limitations such as high catalyst costs, slow reaction rates, and environmental concerns. Traditional catalysts often require expensive materials and result in inefficient and/or slow hydrogen production. The present disclosure uses a cost-effective catalyst that promotes quick hydrogen generation without relying on toxic and/or scarce materials. The simplicity of its preparation and its high catalytic activity also promotes scalability and practical applicability without needing to apply a potential or use electrodes, making it a more efficient and sustainable alternative to existing methods.

Figure 1A:
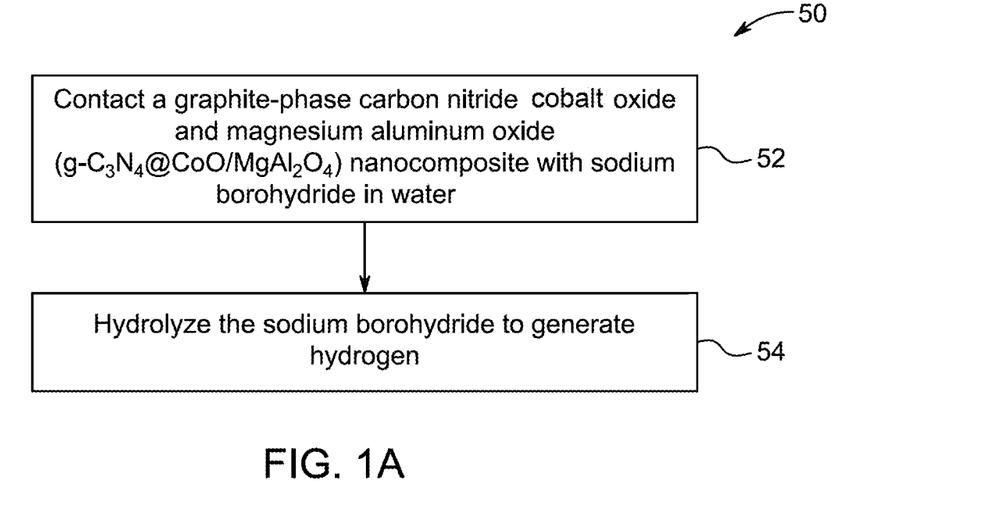
FIG. 1A is a flow chart of a method of hydrogen generation with a graphite-phase carbon nitride cobalt oxide and magnesium aluminum oxide (g-$C_3N_4$@CoO/$MgAl_2O_4$) nanocomposite, according to certain embodiments.

Aspects of the present disclosure pertain to a method of hydrogen generation using a graphite-phase carbon nitride cobalt oxide and magnesium aluminum oxide (g-$C_3N_4$@CoO/MgAl$_2$O$_4$) nanocomposite. FIG. 1A illustrates a schematic flow chart of a method 50 of hydrogen generation. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes contacting a graphite-phase carbon nitride cobalt oxide and magnesium aluminum oxide (g-$C_3N_4$@CoO/MgAl$_2$O$_4$) nanocomposite with sodium borohydride in water. In some embodiments, the contacting occurs at a temperature of 30-50° C., preferably 32-48° C., preferably 34-46° C., preferably 36-44° C., more preferably 38-42° C., and yet more preferably about 40° C. In some embodiments, the contacting occurs for 0.5-10 minutes, preferably 1-9 minutes, preferably 2-8 minutes, preferably 3-7 minutes, preferably 4-6 minutes, and preferably about 5 minutes.

The g-$C_3N_4$@CoO/MgAl$_2$O$_4$ nanocomposite comprises a graphite-phase carbon nitride (g-$C_3N_4$) in an amount of 5 to 15 percent by weight (wt. %), cobalt oxide in an amount of 1 to 10 wt. %, and magnesium aluminum oxide (MgAl$_2$O$_4$) in an amount of 75 to 95 wt. % based on a total weight of the g-$C_3N_4$@CoO/MgAl$_2$O$_4$ nanocomposite. In some embodiments, the g-$C_3N_4$@CoO/MgAl$_2$O$_4$ nanocomposite comprises g-$C_3N_4$ in an amount of 8 to 12 wt. %, preferably 8.5 to 11.5 wt. %, preferably 9 to 11 wt. %, more preferably 9.5 to 10.5 wt. %, and yet more preferably about 10 wt. % based on the total weight of the g-$C_3N_4$@CoO/MgAl$_2$O$_4$ nanocomposite. In a preferred embodiment, the g-$C_3N_4$@CoO/MgAl$_2$O$_4$ nanocomposite comprises graphite-phase carbon nitride (g-$C_3N_4$) in an amount of 10 wt. % based on the total weight of the g-$C_3N_4$@CoO/MgAl$_2$O$_4$ nanocomposite.

In some embodiments, the g-$C_3N_4$@CoO/MgAl$_2$O$_4$ nanocomposite comprises cobalt oxide in an amount of 3 to 7 wt. %, preferably 3.5 to 6.5 wt. %, preferably 4 to 6 wt. %, more preferably 4.5 to 5.5 wt. %, and yet more preferably about 5 wt. % based on the total weight of the g-$C_3N_4$@CoO/MgAl$_2$O$_4$ nanocomposite. In a preferred embodiment, the g-$C_3N_4$@CoO/MgAl$_2$O$_4$ nanocomposite comprises cobalt oxide in an amount of 5 wt. % based on a total weight of the g-$C_3N_4$@CoO/MgAl$_2$O$_4$ nanocomposite.

In some embodiments, the g-$C_3N_4$@CoO/MgAl$_2$O$_4$ nanocomposite comprises magnesium aluminum oxide (MgAl$_2$O$_4$) in an amount of 80 to 90 wt. %, preferably 81 to 89 wt. %, preferably 82 to 88 wt. %, preferably 83 to 87 wt. %, more preferably 84 to 86 wt. %, and yet more preferably about 85 wt. % based on a total weight of the g-$C_3N_4$@CoO/MgAl$_2$O$_4$ nanocomposite. In a preferred embodiment, the g-$C_3N_4$@CoO/MgAl$_2$O$_4$ nanocomposite comprises magnesium aluminum oxide (MgAl$_2$O$_4$) in an amount of 85 wt. % based on a total weight of the g-$C_3N_4$@CoO/MgAl$_2$O$_4$ nanocomposite.

In some embodiments, other borohydride salts such as lithium borohydride, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper (II) borohydride, thallium borohydride, gold borohydride, silver borohydride, rhodium borohydride, palladium borohydride, antimony borohydride, combinations thereof, and the like may be used in place of or in combination with the sodium borohydride.

At step 54, the method 50 includes hydrolyzing the sodium borohydride to generate hydrogen. In some embodiments, an electrical potential is not applied during the contacting. In some embodiments, the hydrogen is generated at a hydrogen generation rate of 1800 to 2200 mL/min, preferably 1825 to 2175 mL/min, preferably 1850 to 2150 mL/min, preferably 1875 to 2125 mL/min, preferably 1900 to 2100 mL/min, preferably 1925 to 2075 mL/min, preferably 1950 to 2050 mL/min, more preferably 1975 to 2025 mL/min, and yet more preferably about 2000 mL/min per gram of g-$C_3N_4$@CoO/MgAl$_2$O$_4$ nanocomposite. In a preferred embodiment, the hydrogen is generated at a hydrogen generation rate of 2000 mL/min per gram of g-$C_3N_4$@CoO/MgAl$_2$O$_4$ nanocomposite.

In some embodiments, the g-$C_3N_4$ is in the form of nanosheets having an average length of 100 to 500 nm, preferably 150 to 450 nm, preferably 200 to 400 nm, and preferably 250 to 350 nm and an average width of 50 to 500 nm, preferably 100 to 450 nm, preferably 150 to 400 nm, preferably 200 to 350 nm, and preferably 250 to 300 nm. In other embodiments, the g-$C_3N_4$ may be in the form of other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, mixtures thereof, and the like.

In some embodiments, the cobalt oxide and the MgAl$_2$O$_4$ are in the form of nanoparticles having an average size ranging from 6 to 12 nm, preferably 7 to 11 nm, preferably 8 to 10 nm, more preferably 8.2 to 9 nm, and yet more preferably 8.5 to 8.7 nm. In a preferred embodiment, the cobalt oxide and the MgAl$_2$O$_4$ are in the form of nanoparticles having an average size of 8.6 nm. In some embodiments, the cobalt oxide and the MgAl$_2$O$_4$ nanoparticles are dispersed on the g-$C_3N_4$ nanosheets.

In one embodiment, the nanocomposite is porous. A porous material is the one that forms a porous bulk solid. Pores may be micropores, mesopores, macropores, and/or a combination thereof. The pores may exist in the bulk material and not necessarily in the molecular structure of the material. The term "microporous" refers to a nanocomposite having pores with an average pore width (i.e., diameter) of less than 2 nm. The term "mesoporous" refers to pores of a nanocomposite having an average pore width of 2-50 nm. The term "macroporous" refers to pores of a nanocomposite having an average pore width larger than 50 nm. Pore size may be determined by methods including, but not limited to, gas adsorption (e.g., N$_2$ adsorption), mercury intrusion porosimetry, and imaging techniques such as scanning electron microscopy (SEM) and X-ray computed tomography (XRCT). In one embodiment, the nanocomposite is porous.

In some embodiments, the g-$C_3N_4$@CoO/MgAl$_2$O$_4$ nanocomposite has interplanar spacing of 0.22 to 0.24 nm, preferably 0.222 to 0.238 nm, preferably 0.224 to 0.236 nm, preferably 0.226 to 0.234 nm, more preferably 0.228 to 0.232 nm, and yet more preferably about 0.23 nm determined by selected area electron diffraction (SAED) analysis. In a preferred embodiment, the g-$C_3N_4$@CoO/MgAl$_2$O$_4$ nanocomposite has an interplanar spacing of 0.22 nm, corresponding to a (100) CoO diffraction plane.

In some embodiments, the g-$C_3N_4$@CoO/MgAl$_2$O$_4$ nanocomposite has interplanar spacing of 0.18 to 0.20 nm, preferably 0.182 to 0.198 nm, preferably 0.184 to 0.196 nm, preferably 0.186 to 0.194 nm, more preferably 0.188 to 0.192 nm, and yet more preferably about 0.19 nm determined by SAED analysis. In a preferred embodiment, the g-$C_3N_4$@CoO/MgAl$_2$O$_4$ nanocomposite has an interplanar spacing of 0.19 nm, corresponding to a (400) spinel diffraction plane.

In some embodiments, the g-$C_3N_4$@CoO/MgAl$_2$O$_4$ nanocomposite has interplanar spacing of 0.12 to 0.14 nm, preferably 0.122 to 0.138 nm, preferably 0.124 to 0.136 nm, preferably 0.126 to 0.134 nm, more preferably 0.128 to 0.132 nm, and yet more preferably about 0.13 nm determined by SAED analysis. In a preferred embodiment, the g-$C_3N_4$@CoO/MgAl$_2$O$_4$ nanocomposite has an interplanar spacing of 0.13 nm, corresponding to a (440) spinel diffraction plane.

In some embodiments, the g-$C_3N_4$@CoO/MgAl$_2$O$_4$ nanocomposite has interplanar spacing of 0.10 to 0.12 nm, preferably 0.102 to 0.118 nm, preferably 0.104 to 0.116 nm, preferably 0.106 to 0.114 nm, more preferably 0.108 to 0.112 nm, and yet more preferably about 0.11 nm determined by SAED analysis. In a preferred embodiment, the g-$C_3N_4$@CoO/MgAl$_2$O$_4$ nanocomposite has an interplanar spacing of 0.11 nm, corresponding to a (103) CoO diffraction plane.

In some embodiments, the nanocomposite may exist in various morphological shapes, including nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nanourchins, nanoflowers, nanostars, tetrapods, combinations thereof, and the like.

In some embodiments, the g-$C_3N_4$@CoO/MgAl$_2$O$_4$ nanocomposite has plane spacing of 0.33 to 0.35 nm, preferably 0.332 to 0.348 nm, preferably 0.334 to 0.246 nm, preferably 0.336 to 0.344 nm, more preferably 0.338 to 0.342 nm, and yet more preferably about 0.34 nm determined by high-resolution transmission electron microscopy (HR-TEM). In a preferred embodiment, the g-$C_3N_4$@CoO/MgAl$_2$O$_4$ nanocomposite has a plane spacing of 0.34 nm, corresponding to a (002) plane of CN.

In some embodiments, the g-$C_3N_4$@CoO/MgAl$_2$O$_4$ nanocomposite has plane spacing of 0.24 to 0.26 nm, preferably 0.242 to 0.258 nm, preferably 0.244 to 0.256 nm, preferably 0.226 to 0.254 nm, more preferably 0.228 to 0.252 nm, and yet more preferably about 0.25 nm determined by HR-TEM. In a preferred embodiment, the g-$C_3N_4$@CoO/MgAl$_2$O$_4$ nanocomposite has a plane spacing of 0.25 nm, corresponding to a (222) spinel plane.

In some embodiments, the g-$C_3N_4$@CoO/MgAl$_2$O$_4$ nanocomposite has plane spacing of 0.19 to 0.21 nm, preferably 0.192 to 0.208 nm, preferably 0.194 to 0.206 nm, preferably 0.196 to 0.204 nm, more preferably 0.198 to 0.202 nm, and yet more preferably about 0.19 nm determined by HR-TEM. In a preferred embodiment, the g-$C_3N_4$@CoO/MgAl$_2$O$_4$ nanocomposite has a plane spacing of 0.19 nm, corresponding to a (400) spinel plane.

In some embodiments, the g-$C_3N_4$@CoO/MgAl$_2$O$_4$ nanocomposite has plane spacing of 0.20 to 0.22 nm, preferably 0.202 to 0.218 nm, preferably 0.204 to 0.216 nm, preferably 0.206 to 0.214 nm, more preferably 0.208 to 0.212 nm, and yet more preferably about 0.21 nm determined by HR-TEM. In a preferred embodiment, the g-$C_3N_4$@CoO/MgAl$_2$O$_4$ nanocomposite has a plane spacing of 0.21 nm, corresponding to the (101) plane of CoO.

In some embodiments, the g-$C_3N_4$@CoO/MgAl$_2$O$_4$ nanocomposite exhibits a d-value ranging from 0.33 to 0.35 nm, preferably 0.332 to 0.348 nm, preferably 0.334 to 0.346 nm, preferably 0.336 to 0.344 nm, more preferably 0.338 to 0.342 nm, and yet more preferably about 0.34 nm. In a preferred embodiment, the g-$C_3N_4$@CoO/MgAl$_2$O$_4$ nanocomposite has a d-value of 0.34 nm.

In an embodiment, the g-$C_3N_4$@CoO/MgAl$_2$O$_4$ nanocomposite is crystalline. In some embodiments, the g-$C_3N_4$@CoO/MgAl$_2$O$_4$ nanocomposite comprises a cobalt oxide (CoO) phase, a magnesium oxide (MgO) phase, a magnesium aluminum oxide (MgAl$_2$O$_4$) phase, and a graphite-phase carbon nitride (g-$C_3N_4$) phase. CoO is a p-type semiconductor with redox properties, making it an active component for catalytic or photocatalytic reactions. MgO is a stable oxide that provides basic sites for catalysis and supports structural integrity. MgAl$_2$O$_4$ is a spinel-structured mixed metal oxide with high mechanical strength, thermal stability, and surface area.

The MgO phase may exist in various configurations like cubic, hexagonal, and the like. In an embodiments, the MgO phase is cubic. In some embodiments, the MgAl$_2$O$_4$ phase is spinel. A spinel phase is a mixed oxide with the general formula AB$_2$O$_4$, including one divalent cation ($A^{2+}$) and two trivalent cations ($B^{3+}$). The unit cell consists of a face-centered cubic arrangement of oxygen ions, containing 32 $O^{2-}$ ions, with 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed "normal." Conversely, when tetrahedral sites are occupied by half of the $B^{3+}$ and octahedral sites by the other half along with $A^{2+}$, the spinel phase is termed "inverse."

A spinel phase with the chemical formula MgAl$_2$O$_4$ is a mineral type of this oxide family. MgAl$_2$O$_4$ has been used in various applications, such as in metallurgical, electrochemical, radio-technical, and chemical industrial fields, owing to its high thermal stability (melting point at 2135° C.), high hardness (16 gigapascal (GPa)), high mechanical resistance, high resistance against chemical attack, wide band gap energy, high electrical resistivity, low thermal expansion coefficient ($9 \cdot 10^{-6}$ 1/° C.) between 3° and 1400° C., low dielectric constant, low density (3.58 gram per cubic centimeter (g/cm$^3$)), high thermal shock resistance, hydrophobicity, and low surface acidity.

In some embodiments, the g-$C_3N_4$@CO/MgAl$_2$O$_4$ nanocomposite does not comprise aluminum oxide (Al$_2$O$_3$). The minimal presence of Al$_2$O$_3$ (less than 1 wt. %, preferably less than 0.8 wt. %, preferably less than 0.5 wt. %, preferably less than 0.3 wt. %, preferably less than 0.1 wt. %, preferably less than 0.05 wt. %, preferably less than 0.03 wt. %, more preferably less than 0.01 wt. %, and yet more preferably 0%) in the g-$C_3N_4$@CoO/MgAl$_2$O$_4$ nanocomposite maintains catalytic properties, high surface reactivity, and efficient adsorption. This promotes performance in environmental remediation, energy production, and biomedical applications, free from interference by less reactive Al$_2$O$_3$ phases. In a preferred embodiment, the g-$C_3N_4$@CoO/MgAl$_2$O$_4$ nanocomposite comprises 0 wt. % Al$_2$O$_3$ based on a total weight of the g-$C_3N_4$@CoO/MgAl$_2$O$_4$ nanocomposite.

In one embodiment, contacting the sodium borohydride with water in the presence of the g-$C_3N_4$@CoO/MgAl$_2$O$_4$ nanocomposite generates 3 to 6 times more hydrogen, preferably 3.5 to 5.5 times more hydrogen, and preferably 4 to 5 times more hydrogen after 5 minutes in comparison to contacting the sodium borohydride with water in the absence of the g-$C_3N_4$@CoO/MgAl$_2$O$_4$ nanocomposite.

Figure 1B:
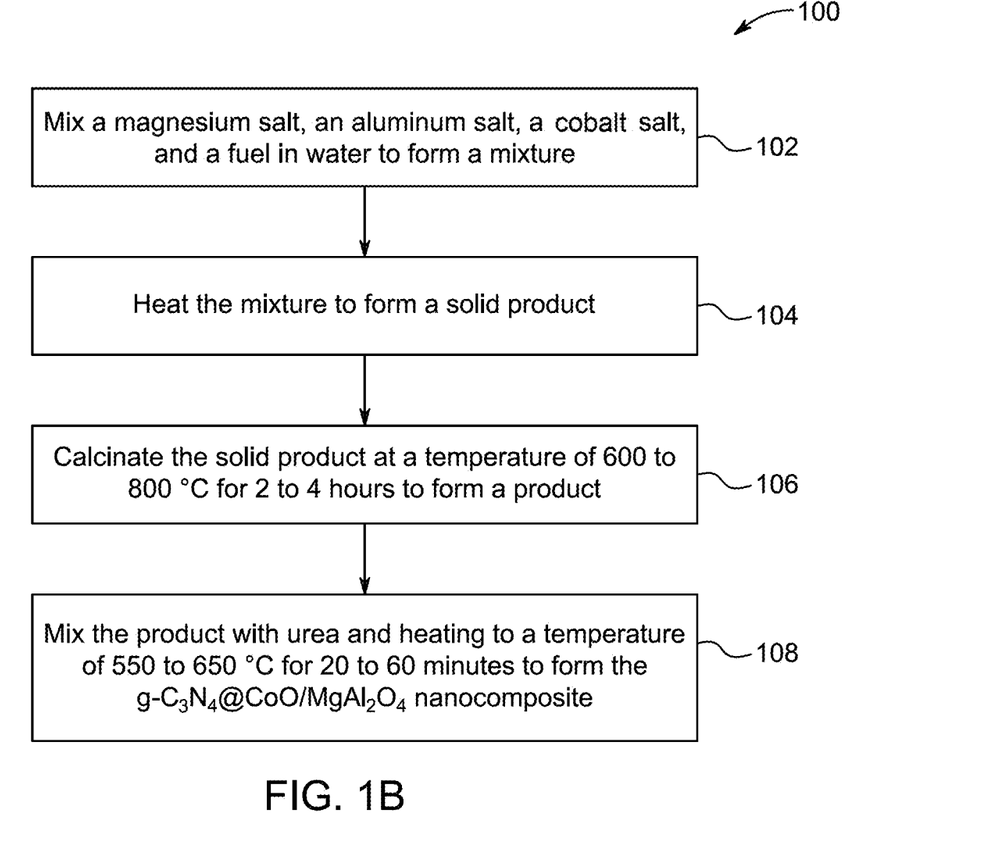
FIG. 1B is a flow chart of a method of forming the g-$C_3N_4$@CoO/$MgAl_2O_4$ nanocomposite, according to certain embodiments.

FIG. 1B illustrates a schematic flow chart of a method 100 of preparing the g-$C_3N_4$@CoO/MgAl$_2$O$_4$ nanocomposite. The order in which the method 100 is described is not intended to be construed as a limitation, and any number of the described method steps can be combined to implement the method 100. Additionally, individual steps may be removed or skipped from the method 100 without departing from the spirit and scope of the present disclosure.

At step 102, the method 100 includes mixing a magnesium salt, an aluminum salt, a cobalt salt, and a fuel in water to form a mixture. In some embodiments, the magnesium salt may include, but is not limited to, magnesium sulfate, magnesium chloride, magnesium oxide, magnesium carbonate, magnesium hydroxide, magnesium bromide, magnesium iodide, magnesium acetate, magnesium fluoride, magnesium tartrate, magnesium citrate, magnesium stearate, magnesium lactate, magnesium gluconate, magnesium salicylate, magnesium perchlorate, magnesium phosphate, magnesium arsenate, magnesium metaborate, magnesium silicate, magnesium molybdate, magnesium tungstate, magnesium chromate, magnesium aluminate, magnesium stannate, magnesium titanate, magnesium ferrocyanide, magnesium pyrophosphate, magnesium benzoate, magnesium nitrate, a combination thereof, and the like. In a preferred embodiment, the magnesium salt is magnesium nitrate.

In some embodiments, the aluminum salt may include, but is not limited to, aluminum sulfate, aluminum chloride, aluminum hydroxide, aluminum oxide, aluminum bromide, aluminum iodide, aluminum acetate, aluminum phosphate, aluminum arsenate, aluminum nitrate hydrate, aluminum tartrate, aluminum citrate, aluminum fluoride, aluminum lactate, aluminum stearate, aluminum silicate, aluminum molybdate, aluminum tungstate, aluminum chromate, aluminum aluminate, aluminum oxalate, aluminum carbonate, aluminum borate, aluminum titanate, aluminum ferrocyanide, aluminum benzoate, aluminum pyrophosphate, aluminum acetylacetonate, aluminum nitrate, a combination thereof, and the like. In a preferred embodiment, the aluminum salt is aluminum nitrate.

In some embodiments, the cobalt salt may include, but is not limited to, cobalt chloride, cobalt sulfate, cobalt oxide, cobalt carbonate, cobalt fluoride, cobalt bromide, cobalt iodide, cobalt tartrate, cobalt citrate, cobalt molybdate, cobalt tungstate, cobalt nitrate hexahydrate, cobalt phosphate, cobalt arsenate, cobalt chromate, cobalt acetate hydrate, cobalt gluconate, cobalt stearate, cobalt lactate, cobalt silicate, cobalt borate, cobalt oxalate, cobalt aluminate, cobalt ferrocyanide, cobalt pyrophosphate, cobalt benzoate, cobalt acetylacetonate, cobalt titanate, cobalt hydroxide, cobalt nitrate, cobalt acetate, a combination thereof, and the like. In a preferred embodiment, the cobalt salt is cobalt acetate.

In some embodiments, fuel may include, but is not limited to, sucrose, glucose, fructose, lactose, maltose, dextrose, glycerol, sorbitol, mannitol, ethylene glycol, propylene glycol, acetone, acetic acid, citric acid, tartaric acid, formic acid, urea, thiourea, hydrazine, glycine, alanine, valine, lysine, serine, leucine, aspartic acid, glutamic acid, ascorbic acid, oxalic acid, benzyl alcohol, polyethylene glycol, a combination thereof, and the like. In a preferred embodiment, the fuel is dextrose.

At step 104, the method 100 includes heating the mixture to form a solid product.

At step 106, the method 100 includes calcinating the solid product at a temperature of 600 to 800° C. for 2 to 4 hours to form a product. In some embodiments, the solid product is calcined at a temperature of 600 to 800° C., preferably 620 to 780° C., preferably 640 to 760° C., preferably 660 to 740° C., more preferably 680 to 720° C., and yet more preferably about 700° C. for 2 to 4 hours, preferably 2.2 to 3.8 hours, preferably 2.4 to 3.6 hours, preferably 2.6 to 3.4 hours, preferably 2.8 to 3.2 hours, and yet more preferably about 3 hours to form a product. In a preferred embodiment, the solid product is calcined at 700° C. for 3 hours to form a product.

At step 108, the method 100 includes mixing the product with urea and heating to a temperature of 550 to 650° C. for 20 to 60 minutes to form g-$C_3N_4$@CoO/MgAl$_2$O$_4$ nanocomposite.

In some embodiments, product is mixed with urea and heated to a temperature of 550 to 650° C., preferably 560 to 640° C., preferably 570 to 630° C., preferably 580 to 620° C., more preferably 590 to 610° C., and yet more preferably about 500° C. for 20 to 60 minutes, preferably 25 to 55 minutes, preferably 30 to 50 minutes, more preferably 35 to 45 minutes, and yet more preferably about 40 minutes to form the g-$C_3N_4$@CoO/MgAl$_2$O$_4$ nanocomposite. In a preferred embodiment, product is mixed with urea and heated to a temperature of 600° C. for 40 minutes to form the g-$C_3N_4$@CoO/MgAl$_2$O$_4$ nanocomposite.

The following examples are provided solely for illustration and are not to be construed as limitations of the present disclosure, as many variations thereof are possible without departing from the spirit and scope of the present disclosure.

EXAMPLES

The following examples describe and demonstrate a method for hydrogen ($H_2$) generation using a g-$C_3N_4$@CoO/MgAl$_2$O$_4$ nanocomposite and a method of production thereof. The examples are provided solely for illustration and are not to be construed as limitations of the present disclosure, as many variations thereof are possible without departing from the spirit and scope of the present disclosure.

Example 1: Fabrication of Graphite-Phase Carbon Nitride Cobalt Oxide and Magnesium Aluminum Oxide (g-$C_3N_4$@CoO/MgAl$_2$O$_4$) Nanocomposite (10:5:85 wt. %)

The g-$C_3N_4$@CoO/MgAl$_2$O$_4$ nanocomposite was synthesized using precursors magnesium nitrate (Mg(NO$_3$)$_2$) and aluminum nitrate (Al(NO$_3$)$_3$). The precursors were mixed in a beaker with cobalt acetate (Co(CH$_3$COO)$_2$) to obtain a composition of CoO@MgAl$_2$O$_4$. Approximately 10 grams (g) of dextrose ($C_6H_{12}O_6$) was added as a fuel source, followed by 30 milliliters (mL) of distilled water (DW). The resultant mixture was then heated until a clear solution was obtained, followed by further heating until dryness. The resulting product was ground using a mortar, transferred to a 150 mL porcelain dish, and subjected to calcination at a temperature of 700° C. for 3.0 hours. The CoO@MgAl$_2$O$_4$ product was allowed to cool to room temperature, weighed, and subsequently ground with urea (CH$_4$N$_2$O) to achieve a weight ratio of 10:5:85 wt. % for the g-$C_3N_4$@CoO/MgAl$_2$O$_4$ nanocomposite. The prepared mixture was then placed in a covered porcelain crucible and heated at 600° C. for 40 minutes. After cooling to room temperature, the g-$C_3N_4$@COO/MgAl$_2$O$_4$ (10:5:85 wt. %) nanocomposite was collected for further use.

Figure 2:
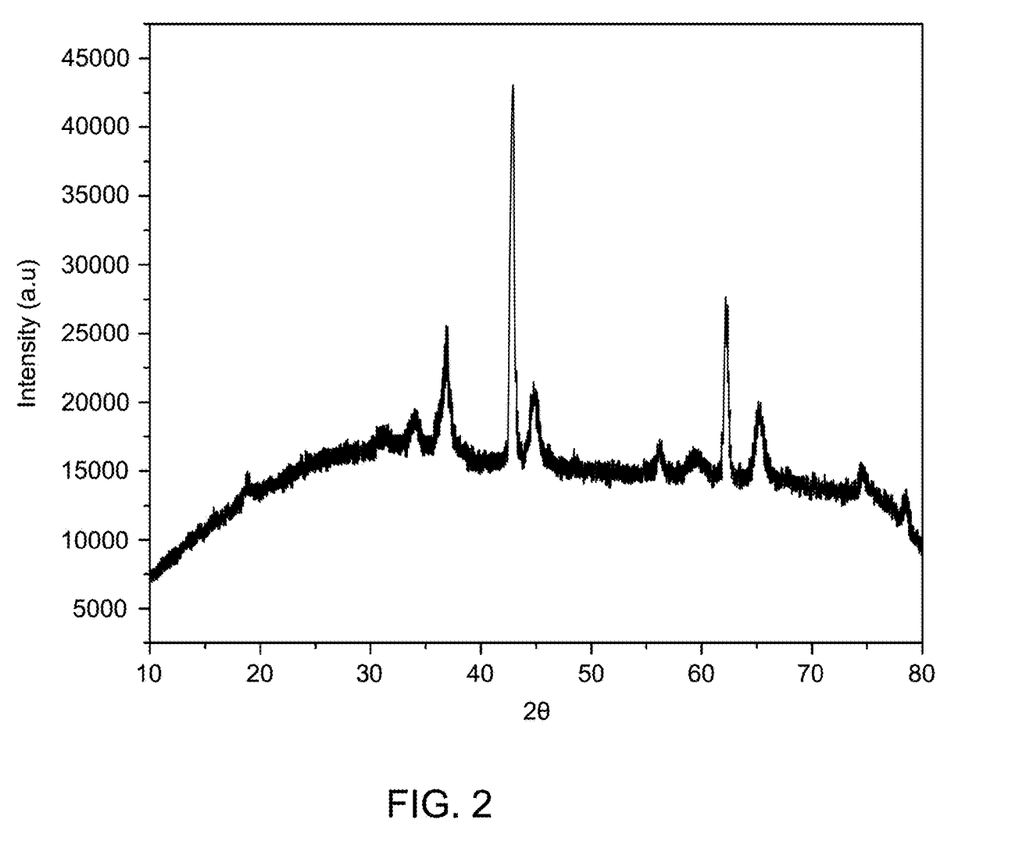
FIG. 2 is a graph depicting X-ray diffraction (XRD) patterns of the g-$C_3N_4$@CoO/$MgAl_2O_4$ nanocomposite, according to certain embodiments.

X-ray diffraction (XRD) patterns of the g-$C_3N_4$/CoO@MgAl$_2$O$_4$ catalyst were analyzed to determine crystallinity and phase composition. Phase identification of the g-$C_3N_4$/CoO@MgAl$_2$O$_4$ catalyst was carried out using XRD analysis, as shown in FIG. 2. The g-$C_3N_4$/CoO@MgAl$_2$O$_4$ catalyst was of high crystallinity, as indicated by the strong peaks and high intensity observed in the XRD diffractogram. On matching the present diffraction lines with those identified in the standard COD cards, the analysis revealed the presence of a cobalt (II) oxide (CoO) phase, a magnesium oxide (MgO) phase, a magnesium aluminate spinel (MgAl$_2$O$_4$) phase, and a graphitic carbon nitride (g-C$_3$N$_4$) phase. Diffraction peaks of the MgAl$_2$O$_4$ spinel were observed at 2θ values of 18.8°, 31.2°, 44.7°, 59.4°, 65.2°, and 74.5°. According to the standard database with COD card No. 9007115, these diffractions were corresponded to the (111), (220), (400), (511) (440) and (620) planes, respectively. The cubic phase of MgO was observed at 2θ values of 36.8°, 62.1°, and 74.5°, corresponding to (111), (220), and (311) planes, respectively, with COD card No. 1000053. The presence of MgO together with the MgAl$_2$O$_4$ spinel phase has been seen previously [Kumar, C. M. S. et al., Solar energy: A promising renewable source for meeting energy demand in Indian agriculture applications, Sustainable Energy Technologies and Assessments, 2023, 55, 102905, which is incorporated herein by reference in its entirety]. Diffraction peaks observed at 36.8°, 42.8°, and 78.4° correspond to the CoO phase, according to COD No. 1522026. Weak diffraction peaks corresponding to CoO were attributed to a low content or a complete dissolution of the CoO with the spinel and g-C$_3$N$_4$ lattices. Diffractions related to g-C$_3$N$_4$ were observed at 44.7° and 59.4° with COD No. 1534042. No other phases were detected, confirming the successful fabrication of g-C$_3$N$_4$@CoO/MgAl$_2$O$_4$.

Figure 3A:
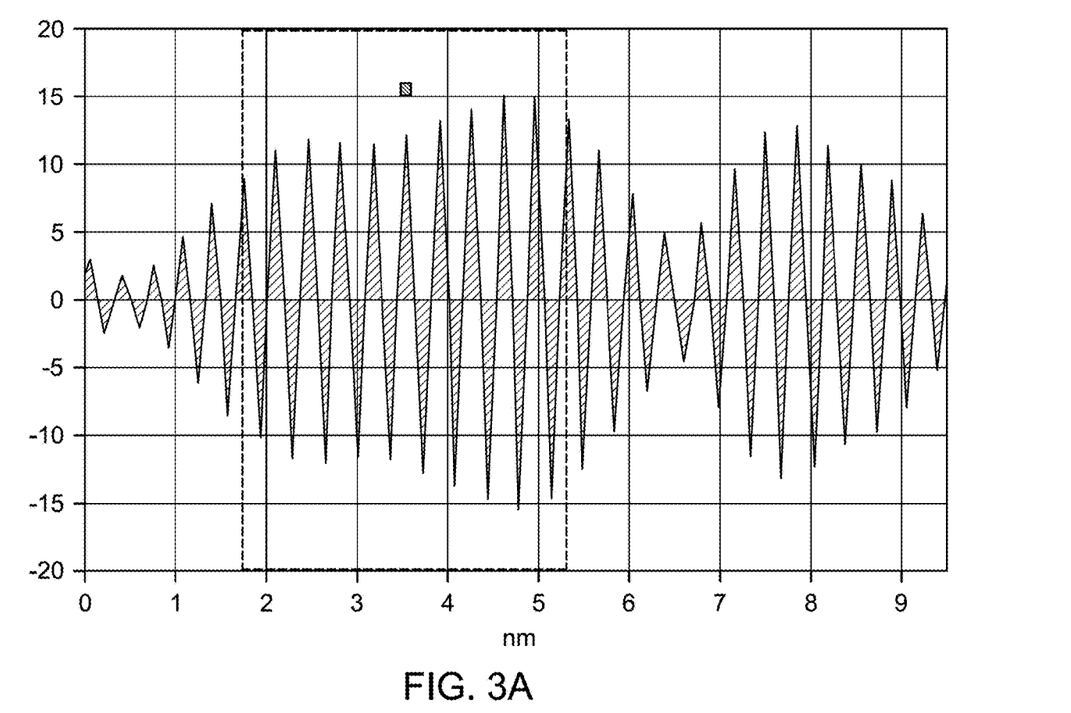
FIG. 3A is a fast Fourier transform (FFT) spectrum of the g-$C_3N_4$@CoO/$MgAl_2O_4$ nanocomposite, according to certain embodiments.
Figure 3B:
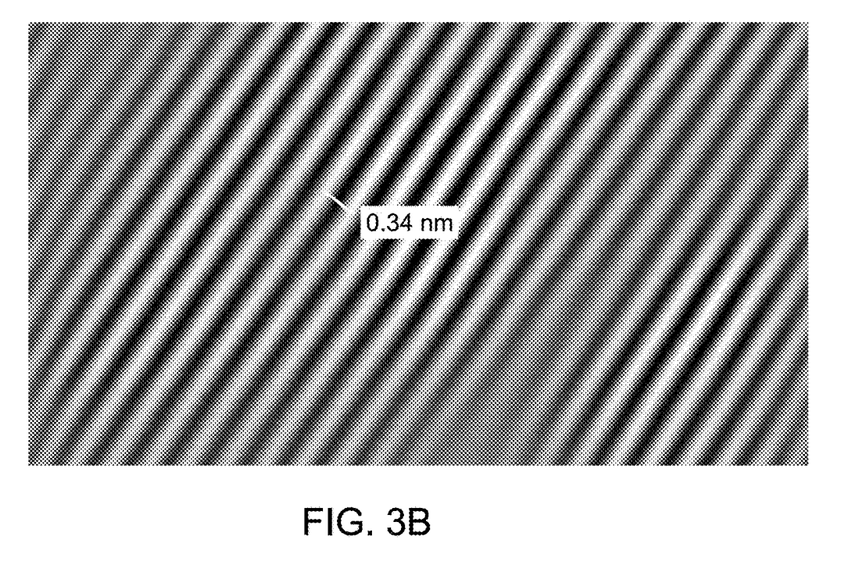
FIG. 3B is an inverse fast Fourier transform (IFFT) spectrum of the g-$C_3N_4$@CoO/$MgAl_2O_4$ nanocomposite, according to certain embodiments.

Fast Fourier transform (FFT) and Inverse Fast Fourier transform (IFFT) measurements revealed a d-spacing value of 0.34 nm given to the g-C$_3$N$_4$@CoO/MgAl$_2$O$_4$ nanocomposite, corresponding to the (002) plane. The observation indicates a development of a spinel structure within the g-C$_3$N$_4$@CoO/MgAl$_2$O$_4$ nanocomposite, as shown in FIGS. 3A-3B.

Figure 3C:
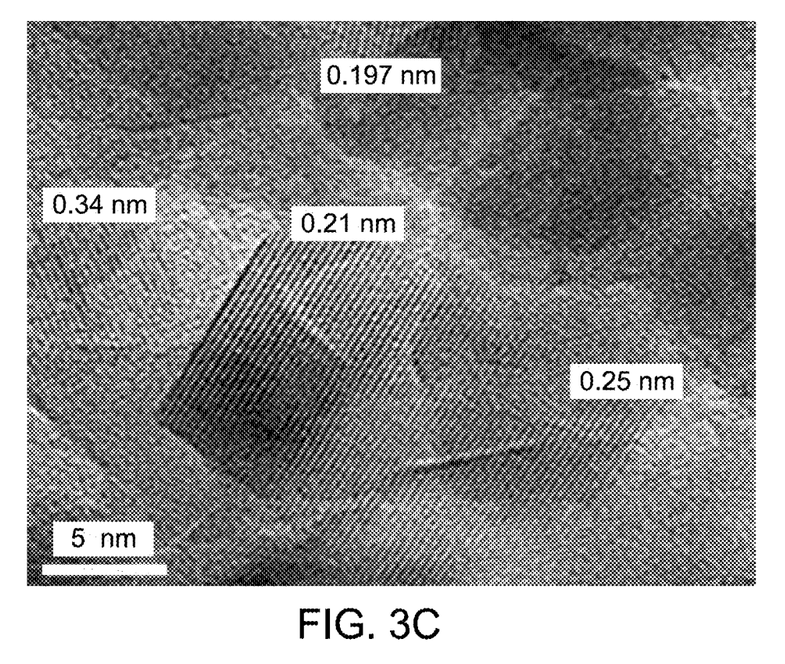
FIG. 3C is a transmission electron microscopy (TEM) image of the g-$C_3N_4$@CoO/$MgAl_2O_4$ nanocomposite, according to certain embodiments.
Figure 3D:
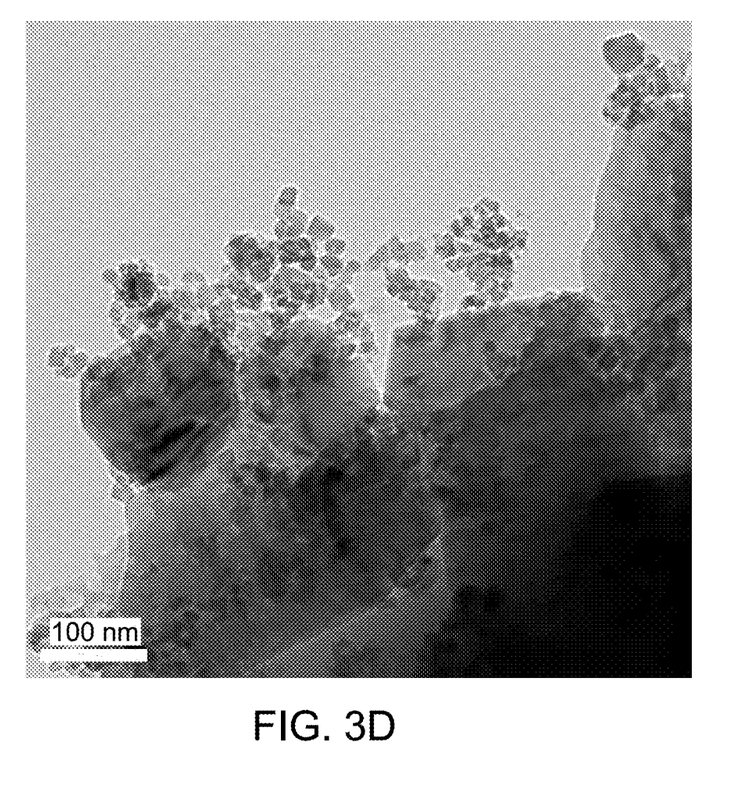
FIG. 3D is a high-resolution transmission electron microscopy (HR-TEM) image of the g-$C_3N_4$@CoO/$MgAl_2O_4$ nanocomposite, according to certain embodiments.
Figure 3E:
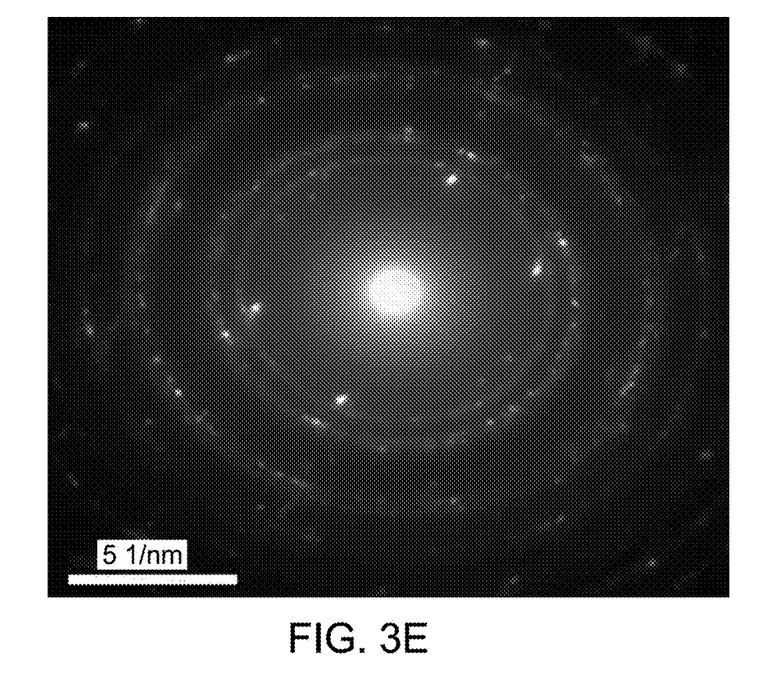
FIG. 3E is a selected area electron diffraction (SAED) pattern of the g-$C_3N_4$@CoO/$MgAl_2O_4$ nanocomposite, according to certain embodiments.

Transmission electron microscopy (TEM) images of the g-C$_3$N$_4$@CoO/MgAl$_2$O$_4$ nanocomposite are shown in FIG. 3D. The TEM images show well dispersion of homogeneous spherical metal oxides nanoparticles with a size of 8.6 nm on a two-dimensional porous structure constructed with curled and wrinkled nanosheets and platelets of the g-C$_3$N$_4$, as shown in FIG. 3D. The corresponding selected area electron diffraction (SAED) pattern, as shown in FIG. 3E, reveals diffraction spots with interplanar spacing of 0.23 nm, 0.19 nm, 0.13 nm, and 0.11 nm, corresponding to diffraction planes (100) of CoO, (400) of spinel, (440) of spinel, and (103) of CoO, respectively. The corresponding HR-TEM of the g-C$_3$N$_4$@CoO/MgAl$_2$O$_4$ nanocomposite showed a plane spacing of 0.34 nm related to the (002) of carbon nitride (CN), 0.25 nm and 0.197 nm related to (222) and (400) planes of spinel, and 0.21 nm related to (101) plane of CoO, characterized the heterostructure formation, as shown in FIG. 3C.

Figure 4:
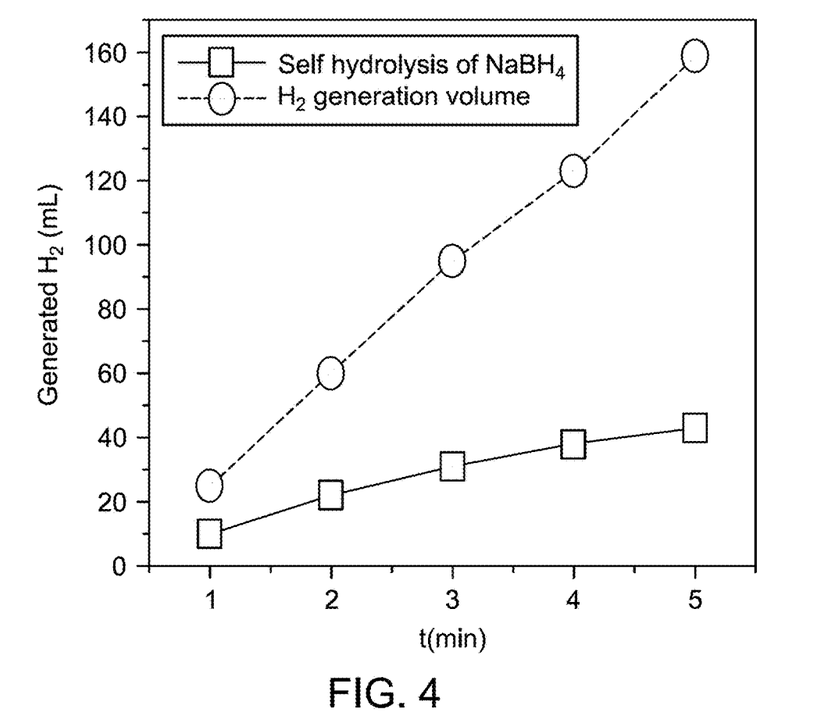
FIG. 4 is a graph depicting variation in volume of liberated $H_2$ versus reaction time over the g-$C_3N_4$@CoO/$MgAl_2O_4$ nanocomposite, according to certain embodiments.

The g-C$_3$N$_4$@CoO/MgAl$_2$O$_4$ nanocomposite was fabricated as a solid catalyst to partial splitting water with the aid of sodium borohydride, thereby producing clean and pure hydrogen within a few minutes without the need for applying external potential or using electrodes. Hydrolysis of NaBH$_4$, with and without the g-C$_3$N$_4$@CoO/MgAl$_2$O$_4$ nanocomposite catalyst, at a reaction temperature of 40° C., is shown in FIG. 4. Catalytic action of the g-C$_3$N$_4$@CoO/MgAl$_2$O$_4$ nanocomposite was observed, and catalytic performance of the g-C$_3$N$_4$@CoO/MgAl$_2$O$_4$ nanocomposite exhibited higher activity than the self-hydrolysis process without the g-C$_3$N$_4$@CoO/MgAl$_2$O$_4$ nanocomposite. The g-C$_3$N$_4$@CoO/MgAl$_2$O$_4$ nanocomposite catalyst offers a hydrogen generation rate (HGR) of 2000 milliliters per minute per gram (mL·min$^{-1}$·g$^{-1}$) at 40° C.

Aspects of the present disclosure provide a method of hydrogen generation using a g-C$_3$N$_4$@CoO/MgAl$_2$O$_4$ nanocomposite. XRD and HR-TEM analysis confirm the successful formation of the g-C$_3$N$_4$@CoO/MgAl$_2$O$_4$ nanocomposite. The g-C$_3$N$_4$@CoO/MgAl$_2$O$_4$ nanocomposite demonstrated the ability to partially split water in the presence of sodium borohydride, producing clean and pure hydrogen within a few minutes, without the necessity for applying external potential or utilizing electrodes.

Numerous modifications and variations of the present disclosure are possible in light of the above teachings. It is, therefore, to be understood that within the scope of the appended claims, the disclosure may be practiced otherwise than as specifically described herein.

The invention claimed is:

1. A method for hydrogen generation, comprising:
   contacting a graphite-phase carbon nitride cobalt oxide and magnesium aluminum oxide (g-C$_3$N$_4$@CoO/MgAl$_2$O$_4$) nanocomposite with sodium borohydride in water; and
   hydrolyzing the sodium borohydride to generate hydrogen,
   wherein the g-C$_3$N$_4$@CoO/MgAl$_2$O$_4$ nanocomposite comprises a graphite-phase carbon nitride (g-C$_3$N$_4$) in an amount of 5 to 15 percent by weight (wt. %), cobalt oxide in an amount of 1 to 10 wt. %, and magnesium aluminum oxide (MgAl$_2$O$_4$) in an amount of 75 to 95 wt. % based on a total weight of the g-C$_3$N$_4$@CoO/MgAl$_2$O$_4$ nanocomposite.

2. The method of claim 1, wherein the hydrogen is generated at a hydrogen generation rate of from 1800 to 2200 mL/min per gram of g-C$_3$N$_4$@CoO/MgAl$_2$O$_4$ nanocomposite.

3. The method of claim 1, wherein the contacting occurs at a temperature of 30 to 50° C.

4. The method of claim 1, wherein 3 to 6 times more hydrogen is liberated after 5 minutes when the sodium borohydride is reacted with water in the presence of the g-C$_3$N$_4$@CoO/MgAl$_2$O$_4$ nanocomposite in comparison to the reaction of sodium borohydride reacted with water in the absence of the g-C$_3$N$_4$@CoO/MgAl$_2$O$_4$ nanocomposite.

5. The method of claim 1, wherein the g-C$_3$N$_4$@CoO/MgAl$_2$O$_4$ nanocomposite has a d-value of 0.33 to 0.35 nm.

6. The method of claim 1, wherein the g-C$_3$N$_4$@CoO/MgAl$_2$O$_4$ nanocomposite comprises a graphite-phase carbon nitride (g-C$_3$N$_4$) in an amount of 8 to 12 percent by weight (wt. %), cobalt oxide in an amount of 3 to 7 wt. %, and magnesium aluminum oxide (MgAl$_2$O$_4$) in an amount of 80 to 90 wt. % based on a total weight of the g-C$_3$N$_4$@CoO/MgAl$_2$O$_4$ nanocomposite.

7. The method of claim 6, wherein the g-C$_3$N$_4$ is in the form of nanosheets having an average length of 100 to 500 nm and an average width of 50 to 500 nm.

8. The method of claim 7, wherein the cobalt oxide and the MgAl$_2$O$_4$ are in the form of nanoparticles having an average size of 6 to 12 nm and wherein the cobalt oxide and the MgAl$_2$O$_4$ nanoparticles are dispersed on the g-C$_3$N$_4$ nanosheets.

9. The method of claim 1, wherein the g-C$_3$N$_4$@CoO/MgAl$_2$O$_4$ nanocomposite has interplanar spacing of 0.22 to 0.24 nm, 0.18 to 0.20 nm, 0.12 to 0.14 nm, and 0.10 to 0.12 nm determined through selected area electron diffraction analysis.

10. The method of claim 1, wherein the g-C$_3$N$_4$@CoO/MgAl$_2$O$_4$ nanocomposite is porous.

11. The method of claim 1, wherein an electrical potential is not applied during the contacting.

12. The method of claim 1, wherein the g-C$_3$N$_4$@CoO/MgAl$_2$O$_4$ nanocomposite has plane spacing of 0.33 to 0.35 nm, 0.24 to 0.26 nm, 0.19 to 0.21 nm, and 0.20 to 0.22 nm determined through high-resolution transmission electron microscopy.

13. The method of claim 1, wherein the g-C$_3$N$_4$@CoO/MgAl$_2$O$_4$ nanocomposite is crystalline.

14. The method of claim 1, wherein the g-C$_3$N$_4$@CuO/MgAl$_2$O$_4$ nanocomposite comprises a cobalt oxide (CoO) phase, a magnesium oxide (MgO) phase, a magnesium aluminum oxide (MgAl$_2$O$_4$) phase, and a graphite-phase carbon nitride (g-C$_3$N$_4$) phase.

15. The method of claim 14, wherein the MgAl$_2$O$_4$ phase is spinel.

16. The method of claim 14, wherein the MgO phase is cubic.

17. The method of claim 1, wherein the g-C$_3$N$_4$@CoO/MgAl$_2$O$_4$ nanocomposite does not comprise aluminum oxide (Al$_2$O$_3$).

18. The method of claim 1, wherein the g-C$_3$N$_4$@CoO/MgAl$_2$O$_4$ nanocomposite is made by a process, comprising:
 mixing a magnesium salt, an aluminum salt, a cobalt salt, and a fuel in water to form a mixture;
 heating the mixture to form a solid product;
 calcinating the solid product at a temperature of 600 to 800° C. for 2 to 4 hours to form a product;
 mixing the product with urea and heating to a temperature of 550 to 650° C. for 20 to 60 minutes to form the g-C$_3$N$_4$@CoO/MgAl$_2$O$_4$ nanocomposite.

19. The method of claim 18, wherein the fuel is dextrose.

20. The method of claim 1, wherein the contacting occurs for 0.5 to 10 minutes.

* * * * *